United States Patent
Dabirian et al.

(10) Patent No.: US 12,053,719 B1
(45) Date of Patent: Aug. 6, 2024

(54) OIL-WATER EMULSION BREAKUP (OWEB) PROCESS AND SYSTEM

(71) Applicant: The University of Tulsa, Tulsa, OK (US)

(72) Inventors: Ramin Dabirian, Atlanta, GA (US); Ilias Gavrielatos, Tulsa, OK (US); Srinivas Swaroop Kolla, Tulsa, OK (US); Ram S. Mohan, Broken Arrow, OK (US); Cristian Daniel Nunez, Cordoba (AR); Ovadia Shoham, Tulsa, OK (US)

(73) Assignee: The University of Tulsa, Tulsa, OK (US)

( * ) Notice: Subject to any disclaimer, the term of this patent is extended or adjusted under 35 U.S.C. 154(b) by 0 days.

(21) Appl. No.: 17/494,124

(22) Filed: Oct. 5, 2021

Related U.S. Application Data

(60) Provisional application No. 63/087,441, filed on Oct. 5, 2020.

(51) Int. Cl.
    *B01D 17/04*     (2006.01)
    *B01D 17/02*     (2006.01)
    (Continued)

(52) U.S. Cl.
    CPC ......... *B01D 17/04* (2013.01); *B01D 17/0217* (2013.01); *B01D 17/12* (2013.01);
    (Continued)

(58) Field of Classification Search
    CPC ...... B01D 17/04; B01D 17/0217; B04C 5/04; B04C 5/081; B04C 5/30; B04C 9/00; B04C 11/00; B04C 2009/008; E21B 43/34
See application file for complete search history.

(56) References Cited

U.S. PATENT DOCUMENTS

| | | | | |
|---|---|---|---|---|
| 4,511,452 A | * | 4/1985 | Robinson | C10G 33/02 |
| | | | | 204/662 |
| 5,961,841 A | * | 10/1999 | Bowers | E21B 43/38 |
| | | | | 210/195.1 |

(Continued)

OTHER PUBLICATIONS

Mathiravedu et. al. 2010. Performance and control of liquid-liquid cylindrical cyclone separators. Journal of Energy Resources Technology Mar. 2010, vol. 132 / 011001 DOI: 10.1115/1.4001132 (Year: 2010).*

(Continued)

*Primary Examiner* — Liam Royce
(74) *Attorney, Agent, or Firm* — Head, Johnson, Kachigian & Wilkinson, PC

(57) ABSTRACT

An oil-water emulsion breakup system. In one embodiment, the system includes an oil-water mixture inlet line configured to receive an oil and water liquid mixture, which may be stabilized by hydrophobic nanoparticles, surfactants of low HLB value, or both. A water injection inlet in communication with the oil-water mixture inlet is configured to direct water into the oil-water mixture inlet. A water sensor is in communication with the oil-water mixture inlet to sense percentage of water in the mixture. A water injection valve in the water injection inlet is in communication with the water sensor. A liquid-liquid separator has an inlet configured to receive a combination of the oil and water mixture and the water, with the separator separating liquid into an oil phase and a water phase. An upper leg in communication with the liquid-liquid separator receives oil separated from the separator. A lower leg in communication with the liquid-liquid separator receives water separated in the liquid-liquid separator.

6 Claims, 4 Drawing Sheets

(51) Int. Cl.
  B01D 17/12      (2006.01)
  B04C 5/04       (2006.01)
  B04C 5/081      (2006.01)
  B04C 5/30       (2006.01)
  B04C 9/00       (2006.01)
  B04C 11/00      (2006.01)
  E21B 43/34      (2006.01)
(52) U.S. Cl.
  CPC ........... *B04C 5/04* (2013.01); *B04C 5/081* (2013.01); *B04C 5/30* (2013.01); *B04C 9/00* (2013.01); *B04C 11/00* (2013.01); *E21B 43/34* (2013.01); *B04C 2009/008* (2013.01)

(56) References Cited

U.S. PATENT DOCUMENTS

| | | | |
|---|---|---|---|
| 8,715,513 B2 * | 5/2014 | Mantilla | B04C 5/04 210/512.1 |
| 2013/0026082 A1 * | 1/2013 | Al-Shafei | C10G 31/08 210/96.1 |
| 2020/0240255 A1 * | 7/2020 | Forthuber | B01D 19/0068 |

OTHER PUBLICATIONS

Hreiz et. al. 2014 On the effect of the nozzle design on the performances of gas-liquid cylindrical cyclone separators. International Journal of Multiphase Flow 58:15-26. (Year: 2014).*

Zhao, H., Mohan, R., and Shoham, O.: "Three-Phase Flow Zero-Net Liquid Holdup in Gas-Liquid Cylindrical Cyclone (GLCC ©)", Integral Methods in Science and Engineering Conference (IMSE2022), Jul. 11-15, 2022.

Shah, M., Zhao, H., Mohan, R., and Shoham, O.: "Variation of Zero-Net Liquid Holdup in Gas-Liquid Cylindrical Cyclone (GLCC ©)", In: Constanda, C., Bodmann, B.E., Harris, P.J. (eds) Integral Methods in Science and Engineering, Chapter 22, Birkhäuser, Cham. https://doi.org/10.1007/978-3-031-07171-3_22, May 26, 2022, Print ISBN978-3-031-07170-6, Online ISBN978-3-031-07171-3.

Kolla, S.S., Mohan, R.S. and Shoham, O. "Numerical Analysis of Flow Behavior in Gas-Liquid Cylindrical Cyclone (GLCC) Separators With Inlet Design Modifications", ASME Journal of Energy Resources Technology, Paper No. JERT-19-1702, 2019, Jun. 8, 2021, https://doi.org/10.1115/1.4051423.

Kolla, S.S., Mohan, R.S. and Shoham, O. "Swirling Flow Regimes and Gas Carry-Under in Gas Liquid Cylindrical Cyclone Separators in Separated Outlet Configuration", ASME Journal of Energy Resources Technology, Paper No. JERT-19-1823, vol. 143, p. 042304-1-8, Apr. 2021, https://doi.org/10.1115/1.4048230.

Kolla, S.S., Mohan, R.S. and Shoham, O., "Analysis of GLCC Separator with Inlet Modifications using Fluid-Structure Interaction", ASME Journal of Energy Resources Technology, JERT-18-1626, 142(4):9 pages DOI: 10.1115/1.4044762, Sep. 2019.

Kolla, S.S., Mohan, R.S. and Shoham, O., "A Study on the Effect of Fluid Properties and Watercut on Liquid Carry-Over in Gas-Liquid Cylindrical Cyclones" Journal of Fluids Engineering, FE-18-1178, 141(9), 091303, Apr. 15, 2019, doi: 10.1115/1.4043161.

Karaaslan, M., Dabirian, R., Mohan, R., and Shoham, O.: "Foam Breakup in Inlet Cyclones", Journal of Natural Gas Science and Engineering, v 55, pp. 89-105, Jul. 2018, doi:10.1016/j.jngse.2018.04.024.

Kolla, S.S., Mohan, R. S. and Shoham, O.: "Structural Integrity Analysis of GLCC© Separator Inlet", ASME Journal of Energy Resources Technology, JERT-17-1241, vol. 140, Issue 5, 2018, doi:10.1115/1.4038622.

Moncayo, J. A., Dabirian, R., Mohan, R., Shoham, O. and Kouba, G. "Modeling Foam Break-up in Batch Separators and Cylindrical Cyclones", SPE Journal, SPE-194002, 2018.

Moncayo, J. A., Dabirian, R., Mohan, R., Shoham, O. and Kouba, G. "Foam Break-up Under Swirling Flow in Inlet Cyclone and GLCC ©", Journal of Petroleum Science and Engineering, 165, 234-242, 2018, doi:10.1016/j.petrol.2018.02.027.

Pereyra, E., Gomez, L., Mohan, R., Shoham, O., and Kouba, G.: "Design and Performance of Gas-Liquid Cylindrical Cyclone/Slug Damper System," Integral Methods for Scientists and Engineers (IMSE), ISBN 978-0-8176-823-8, pp. 299-311 (Aug. 2011).

Wang, S., Gomez, L.E., Mohan, R.S., Shoham, O., Kouba G.E. and Marrelli, J. D: "The State-of-the-Art of Gas-Liquid Cylindrical Cyclone Control Technology: From Lab to Field," ASME Transactions, Journal of Energy Resources Technology, vol. 132, pp. 032701-1-9, Sep. 2010.

Mathiravedu, R., Wang, S., Mohan, R.S., Shoham, O., Marrelli, J. D: "Performance and Control of Liquid-Liquid Cylindrical Cyclone Separators," ASME Transactions, Journal of Energy Resources Technology, Mar. 2010, vol. 132, pp. 1-9.

Molina, R., Wang, S., Gomez, L.E., Mohan, R., Shoham, O. and Kouba, G.E.: "Wet Gas Separation in Gas-Liquid Cylindrical Cyclone (GLCC ©) Separator", ASME Journal of Energy Resources Technology (JERT), vol. 130/042701-1. Dec. 2008.

Oropeza-Vazquez, C., Afanador, E., Gomez, L., Wang, S., Mohan, R., Shoham, O. and Kouba, G.: "Oil-Water Separation in Novel Liquid-Liquid Cylindrical Cyclone (LLCC) Compact Separator—Experiment and Modeling", presented at the ASME/JSME FED summer meeting, Honolulu, Hawaii, Jul. 6-10, 2003, ASME J. Fluids Eng., v. 124, No. 4, pp. 553-564, Jul. 2004.

Sampath, V., Wang, S., Mohan, R.S. and Shoham, O.: "A Matter of Separation: Adaptive control technique clears the way for GLCC separators," Delta Tech magazine, a supplement to INTECH magazine of the Instrumentation, Systems, and Automation Society-ISA, p. 5-10, Apr. 2004.

Wang, S., Gomez, L.E., Mohan, R.S., Shoham, O., Marrelli, J. D. and Kouba, G.E.: "Gas-Liquid Cylindrical Cyclone Compact Separators for Wet Gas Applications", ASME Transactions, Journal of Energy Resources Technology, v. 125, pp. 43-50, Mar. 2003.

Earni, S., Wang, S., Mohan, R.S., Shoham, O.: "Slug Detection as a Tool for Predictive Control of GLCC Compact Separators," ASME Transactions, Journal of Energy Resources Technology, v. 125 (2), pp. 145-153, Jun. 2003.

Wang, S., Mohan, R., Shoham, O., Marrelli, J., and Kouba, G.: "Optimal Control Strategy and Experimental Investigation of Gas-Liquid Cylindrical Cyclone Compact Separators", SPE 63120, presented at the SPE 74th Annual Meeting, Dallas, TX, Oct. 1-4, 2000, SPE Journal, 7 (2), pp. 170-182, Jun. 2002.

Wang, S., Mohan, R.S., Shoham, O. and Kouba, G.E.: "Dynamic Simulation and Control System Design for Gas-Liquid Cylindrical Cyclone Separators," SPE Journal, vol. 6, No. 2, pp. 236-247, Jun. 2001.

S. Wang, R. S. Mohan, O. Shoham, J.D. Marrelli, & G. E. Kouba, "Control System Simulators for Gas Liquid Cylindrical Cyclone Separators," ASME Transactions, Journal of Energy Resources Technology, vol. 122(4), pp. 177-184, Dec. 2000. 22.

S. Wang, R. S. Mohan, O. Shoham, J.D. Marrelli, & G. E. Kouba, "Performance Improvement of Gas Liquid Cylindrical Cyclone Separators Using Integrated Liquid Level and Pressure Control Systems," ASME Transactions, Journal of Energy Resources Technology, vol. 122(4), pp. 185-192, Dec. 2000.

W. A. Chirinos, L.E. Gomez, S. Wang, R. S. Mohan, and O. Shoham, "Liquid Carry-over in Gas-Liquid Cylindrical Cyclone Compact Separators", SPE Journal, vol. 5, No. 3, pp. 259-267, Sep. 2000.

L. E. Gomez, R. S. Mohan, O. Shoham, & G. E. Kouba, "Enhanced Mechanistic Model and Field Application Design of Gas-Liquid Cylindrical Cyclone Separators" SPE Journal, vol. 5, No. 2, pp. 190-198, Jun. 2000.

S. Movafaghian, J.A. Jaua-Marturet, R. S. Mohan, O. Shoham, & G. E. Kouba, "The Effects of Geometry, Fluid Properties and Pressure on the Hydrodynamics of Gas-Liquid Cylindrical Cyclone Separators", International Journal of Multiphase Flow, vol. 26, No. 6, pp. 999-1018, Jun. 2000.

L. E. Gomez, R. S. Mohan, O. Shoham, J. D. Marrelli, & G. E. Kouba, "Aspect Ratio Modeling and Design Procedure for GLCC Compact Separators" ASME Transactions, Journal of Energy Resources Technology, vol. 121(1), pp. 15-23, 1999.

(56) References Cited

OTHER PUBLICATIONS

R. S. Mohan, S. Wang, O. Shoham, & G. E. Kouba, "Design and Performance of Passive Control System for Gas-Liquid Cylindrical Cyclone Separators" ASME Transactions, Journal of Energy Resources Technology, vol. 120(1), pp. 49-55, 1998.
Shah, M. J., Kolla, S.S., Mohan, R.S. and Shoham, O., "Variation of Zero-Net Liquid Holdup in Gas-Liquid Cylindrical Cyclone Separator Below Operational Envelope" Proceedings of the ASME 2020 Fluids Engineering Division Summer Meeting, FEDSM2020-12205, Jul. 12-16, 2020, Orlando, FL, USA.
Kolla, S.S., Mohan, R.S. and Shoham, O., "Gas Carry-Under in Gas-Liquid Cylindrical Cyclone (GLCC) Compact Separators—A Mechanistic Model", AJKFLUIDS2019-4735, Proceedings of the ASME-JSME-KSME 2019 Joint Fluids Engineering Conference, San Francisco, Jul. 28-Aug. 1, 2019.
Kolla, S.S., Mohan, R.S. and Shoham, O., "Numerical Study of Flow Physics in Gas-Liquid Cylindrical Cyclone (GLCC) Separator", AJKFLUIDS2019-4736, Proceedings of the ASME-JSME-KSME 2019 Joint Fluids Engineering Conference, San Francisco, July 28-Aug. 1, 2019.
Kolla, S.S., Mohan, R.S. and Shoham, O., "Tangential Wall Jet Flow in Gas-Liquid Cylindrical Cyclone (GLCC) Compact Separator", AJKFLUIDS2019-4737, Proceedings of the ASME-JSME-KSME 2019 Joint Fluids Engineering Conference, San Francisco, July 28-Aug. 1, 2019.
Kolla, S.S., Karpurapu, M.P., Mohan, R.S. and Shoham, O.: "Mechanistic Modeling of Dynamic Zero Net Liquid Holdup in Gas-Liquid Cylindrical Cyclone separator", IMECE2018-88481, Proceedings of the ASME 2018 International Mechanical Engineering Congress & Exposition, Pittsburgh, PA, Nov. 9-15, 2018.
Dabirian, R., Nababan, A., Gavrielatos, I., Mohan, R. and Shoham, O., "Foam Breakup in CFC/GLCC © System", FEDSM2018-83315, Technical Presentation, Proceedings of the ASME 2018 5th Joint US-European Fluids Engineering Summer Conference, Montreal, Quebec, Canada, Jul. 15-20, 2018.
Dabirian, R., Nitasari, P., Gavrielatos, I., Mohan, R. and Shoham, O., "Utilization of Churn Flow Coalescer (CFC) for Improving Foam Breakup in Gas-liquid Cylindrical Cyclone", FEDSM2018-83317, Technical Presentation, Proceedings of the ASME 2018 5th Joint US-European Fluids Engineering Summer Conference, Montreal, Quebec, Canada, Jul. 15-20, 2018.
Karpurapu, M.P., Kolla, S.S., Mohan, R.S. and Shoham, O.: "Dynamic Zero-Net Liquid Holdup (ZNLH) in Gas-Liquid Cylindrical Cyclones", FEDSM2018-83309, Proceedings of the ASME 2018 5th Joint US-European Fluids Engineering Summer Conference, Montreal, Quebec, Canada, Jul. 15-20, 2018.
Kolla, S.S., Mohan, R.S. and Shoham, O.: "Effect of Liquid Level on Gas Carry-Under in GLCC Compact Separators", FEDSM2018-83301, Proceedings of the ASME 2018 5th Joint US-European Fluids Engineering Summer Conference, Montreal, Quebec, Canada, Jul. 15-20, 2018.
Kolla, S.S., Mohan, R.S. and Shoham, O.: "Gas Carry-Under in GLCC for Separated and Recombined Outlet Configurations", FEDSM2018-83406, Proceedings of the ASME 2018 5th Joint US-European Fluids Engineering Summer Conference, Montreal, Quebec, Canada, Jul. 15-20, 2018.
Kolla, S.S., Mohan, R.S. and Shoham, O.: "Mechanistic Modeling of Liquid Carry-Over for 3-Phase Flow in GLCC Compact Separators", FEDSM2018-83407, Proceedings of the ASME 2018 5th Joint US-European Fluids Engineering Summer Conference, Montreal, Quebec, Canada, Jul. 15-20, 2018.
Mohan, R.S. and Shoham, O., "Control Strategies for Multiphase Compact Separators—Development and Implementation," Proceedings of the 15th International Conference on Integral Methods for Scientists and Engineers (IMSE), Jul. 16-20, 2018, Brighton, UK.
Kolla, S.S., Mohan, R. S., and Shoham, O.: "Fluid-Structure Interaction Study of GLCC © Inlet Modifications" FEDSM2017-69412, Proceedings of ASME 2017 Fluids Engineering Summer Conference, Jul. 30-Aug. 3, 2017, Hawaii, USA.
Kolla, S.S., Mohan, R. S., and Shoham, O.: "Computational Fluid Dynamics Study on the Effect of Inlet Section Modifications of GLCC © Compact Separators" FEDSM2017-69413, Proceedings of ASME 2017 Fluids Engineering Summer Conference, Jul. 30-Aug. 3, 2017, Hawaii, USA.
Kolla, S.S., Mohan, R. S., and Shoham, O.: "Experimental Investigation of Liquid Carry-over in GLCC © Separators for 3-Phase Flow", IMECE2016-67457, Proceedings of IMECE2016, 2016 ASME International Mechanical Engineering Congress and Exposition, Phoenix, AZ, Nov. 10-17, 2016.
Kolla, S.S., Mohan, R. S., and Shoham, O.: "Structural Integrity Analysis of GLCC © Separator Inlet", IMECE2016-67863, Proceedings of IMECE2016, 2016 ASME International Mechanical Engineering Congress and Exposition, Phoenix, AZ, Nov. 10-17, 2016.
Dabirian, R., Thompson, L., Mohan, R., Shoham, O. and Avila, C.: "Prediction of Two-Phase Splitting in Looped Lines Based on Energy Minimization," SPE 166197, Proceedings of the SPE Annual Technical Conference and Exhibition (SPE ATCE), New Orleans, LA, Sep. 30-Oct. 2, 2013.
Alvarez, L., Mohan, R. S., Shoham, O., Gomez, L. and Avila, C.: "Multiphase Flow Splitting in Looped Pipelines" Proceedings of 12th International ISME Conference, Bento Gonçalves, Brazil, Jul. 23-27 (2012).
Alvarez, L., Mohan, R., Shoham, O., and Avila, C.: "Multiphase Flow Splitting in Parallel/Looped Pipelines," SPE 135723, Proceedings of 2010 SPE Annual Technical Conference and Exhibition, Sep. 20-22, 2010, Florence, Italy.
Sampath, V., Mohan, R.S., Wang, S., Gomez, L.E., Shoham, O., and Marrelli, J. D: "Intelligent Control of Compact Multiphase Separation System (CMSS ©) Part 1 —Modeling and Simulation," FEDSM2009-78422, Proceedings of ASME 2009 Fluids Engineering Division Summer Meeting, Aug. 2-5, 2009, Vail, CO, USA.
Sampath, V., Mohan, R.S., Wang, S., Gomez, L.E., Shoham, O., and Marrelli, J. D: "Intelligent Control of Compact Multiphase Separation System (CMSSO) Part II—Experimental Investigation," FEDSM2009-78423, Proceedings of ASME 2009 Fluids Engineering Division Summer Meeting, Aug. 2-5, 2009, Vail, Colorado USA.
N. Guzmán, O. Shoham, O., and Mohan, R.S.: "Study of Foam Flow in a Gas-Liquid Cylindrical Cyclone (GLCC) Compact Separator," FEDSM2009-78419, Proceedings of ASME 2009 Fluids Engineering Division Summer Meeting, Aug. 2-5, 2009, Vail, CO, USA.
Arismendi, R., Gomez, L., Wang, S., Mohan, R., Shoham, O., and Oglesby, K.: "Utilization of Gas-Liquid Cylindrical Cyclone (GLCC ©) Compact Separator for Solids Removal: Part 1—Minimum Required Liquid Injection Rate," Proceedings of 28th International Conference on Ocean, Offshore and Arctic Engineering (Paper: OMAE2009-80192), Honolulu, Hi, USA; May 31-Jun. 5, 2009.
Pereyra, E., Gomez, L., Mohan, R., Shoham, O., and Kouba, G.: "Transient Mechanistic Model for Slug Damper/Gas-Liquid Cylindrical Cyclone (GLCC ©) Compact Separator System," Proceedings of 28th International Conference on Ocean, Offshore and Arctic Engineering (Paper: OMAE2009-80193), Honolulu, Hi, USA; 31 May 31-Jun. 5, 2009.
Omarov, S., Gomez, L., Wang, S., Mohan, R., Shoham, O., and Oglesby, K.: "Utilization of Gas-Liquid Cylindrical Cyclone (GLCC ©) Compact Separator for Solids Removal: Part 2—Operational Envelope for Carry-Over," Proceedings of 28th International Conference on Ocean, Offshore and Arctic Engineering (Paper: OMAE2009-80196), Honolulu, Hi, USA; May 31-Jun. 5, 2009.
Reinoso, A., Gomez, L.E., Wang, S., Mohan, R., Shoham, O. and Kouba, G.E.: "Design and Performance of Slug Damper", accepted for the 26th International Conference on Offshore Mechanics and Arctic Engineering (Paper: OMAE2007-29387), San Diego, CA, Jun. 10-15, 2007.
Molina, R., Wang, S., Gomez, L.E., Mohan, R., Shoham, O. and Kouba, G.E.: "Wet Gas Separation in Gas-Liquid Cylindrical Cyclone (GLCC ©) Separator", accepted for the 26th International Conference on Offshore Mechanics and Arctic Engineering (Paper: OMAE2007-29386), San Diego, CA, Jun. 10-15, 2007.
Wang, S., Gomez, L.E., Mohan, R.S., Shoham, O., Fang, Z., Xiao, J.J., Al-Muralkhi, A. and Al-Dawas, S.: "Compact Multiphase Inline

(56) References Cited

OTHER PUBLICATIONS

Water Separation (IWS) System—A New Approach for Produced Water Management and Production Enhancement," SPE-104252-PP; presented at the 2006 SPE International Oil & Gas Conference and Exhibition in China held in Beijing, China, Dec. 5-7, 2006.

Mathiravedu, R., Wang, S., Mohan, R.S., Shoham, O., Marrelli, J. D: "Performance and Control of Liquid-Liquid Cylindrical Cyclone Separators," Proceedings of ASME Energy Sources Technology Conference and Exhibition, ETCE '02, Houston, TX, Feb. 4-6, 2002. (Awarded ETCE'02 Jacobson Best Paper Award).

Avila, C., Wang, S., Gomez, L., Mohan, R.S. and Shoham, O.: "Development of Control System for Integrated Three-Phase Compact Separators, Part II-Mathematical Modeling" Proceedings of ISA EXPO 2003, Oct. 21-23, Houston, TX.

Sampath, V., Wang, S., Mohan, R.S. and Shoham, O.: "Adaptive Control Technique a Solution for GLCC Separators," Proceedings of ISA EXPO 2003, Oct. 21-23, 2003, Houston, TX.

Gomez, L., Mohan, R. and Shoham, O.: "Flow Field, Turbulent Quantities, and Core Stability in Gas-Liquid Two-Phase Swirling Flow—Experiment and Modeling", proceedings of the ASME/JSME Fed summer meeting, Honolulu, Hawaii, Jul. 6-10, 2003.

Oropeza-Vazquez, C., Afanador, E., Gomez, L., Wang, S., Mohan, R., Shoham, O. and Kouba, G.: "Oil-Water Separation in Novel Liquid-Liquid Cylindrical Cyclone (LLCC) Compact Separator—Experiment and Modeling", proceedings of the ASME/JSME Fed summer meeting, Honolulu, Hawaii, Jul. 6-10, 2003.

Wang, S., Gomez, L.E., Mohan, R.S., Shoham, O., Kouba G.E. and Marrelli, J. D: "The State-on-the-Art of Gas-Liquid Compact Separator Control Technology-From Lab to Field," proceedings of 8th International Symposium on Gas-Liquid Flows: ASME/JSME Joint Fluids Engineering Division Summer Meeting, Jul. 6-10, 2003, Honolulu, Hawaii.

Mohan, R.S., Shoham, O., Gomez, L.E. and Wang, S., "Application of Gas-Liquid Cylindrical Cyclone (GLCC ©) in Hydrocarbon Industry with Specific Reference to Deepwater Technology", proceedings of the 5th International Petroleum Conference and Exhibition, Petrotech 2003—New Delhi, India, Jan. 9-12, 2003. Received Best Paper award for the Oral Presentation Category—The Deepwater Challenge Session.

S. Wang, L. E. Gomez, R. S. Mohan, O. Shoham, & G. E. Kouba, "Gas Liquid Cylindrical Cyclone (GLCC) Compact Separators for Wet Gas Applications," Proceedings of the ETCE 2001 Conference of ASME Petroleum Division of ASME Petroleum Division, Houston, TX, Feb. 5-7, 2001.

S. Earni, S. Wang, R. S. Mohan, & O. Shoham, "Slug Detection as a Tool for Predictive Control of Gas Liquid Cylindrical Cyclone Separators," Proceedings of the ETCE 2001 Conference of ASME Petroleum Division of ASME Petroleum Division, Houston, TX, Feb. 5-7, 2001.

S. Wang, R. S. Mohan, O. Shoham, J. D. Marrelli and G. E. Kouba, "Optimal Control Strategy and Experimental Investigation of Gas-Liquid Compact Separators", (refereed abstract) full paper in Proceedings of the 2000 SPE Annual Technical Conference and Exhibition, Dallas, TX, Oct. 1-4, 2000.

S. Wang, R. S. Mohan, O. Shoham, J.D. Marrelli, & G. E. Kouba, "Control System Simulators for Gas Liquid Cylindrical Cyclone Separators," (refereed abstract) full paper in the proceedings of the ETCE/OMAE 2000 Joint Conference of ASME Petroleum Division, New Orleans, LA, Feb. 14-17, 2000.

S. Wang, R. S. Mohan, O. Shoham, Marrelli, J.D. & G. E. Kouba, "Performance Improvement of Gas Liquid Cylindrical Cyclone Separators Using Integrated Liquid Level and Pressure Control Systems," (refereed abstract) full paper in the proceedings of the ETCE/OMAE 2000 Joint Conference of ASME Petroleum Division, New Orleans, LA, Feb. 14-17, 2000.

F.M. Erdal, S. A. Shirazi, I. Mantilla, and O. Shoham, "Computational Fluid Dynamics (CFD) Study of Bubble Carry-under in Gas-Liquid Cylindrical Cyclone (GLCC) Compact Separators", Proceedings of the 1998 SPE Annual Technical Conference and Exhibition, New Orleans, LA, Sep. 27-30, 1998, SPE Production and Facilities, vol. 14 (4), Nov. 2000.

I. Mantilla, Shirazi, S. A. and O. Shoham, "Flow Field Prediction and Bubble Trajectory Model in Gas-Liquid Cylindrical Cyclone (GLCC) Compact Separators", Proceedings of the ETCE-99 Conference and Exhibition, Houston, TX, Feb. 1-2, 1999.

W. A. Chirinos, L.E. Gomez, S. Wang, R. S. Mohan, and O. Shoham, "Liquid Carry-over in Gas-Liquid Cylindrical Cyclone (GLCC) Compact Separators", (refereed abstract) full paper in Proceedings of the 1999 SPE Annual Technical Conference and Exhibition, Houston, TX, Oct. 3-6, 1999.

L.E. Gomez, R. S. Mohan, O. Shoham, Jack Marrelli, and G.E. Kouba, "State-of-the-art Simulator for Field Applications of Gas-Liquid Cylindrical Cyclone Separators", (refereed abstract), SPE 56581, full paper in Proceedings of the 1999 SPE Annual Technical Conference and Exhibition, Houston, TX, Oct. 3-6, 1999.

R. S. Mohan, and O. Shoham, "Technologies Under Development: Design and Development of Gas-Liquid Cylindrical Cyclone Compact Separators for Three-Phase Flow", (refereed abstract) full paper in Proceedings of the 1999 Oil and Gas Conference—Technology Options for Producers' Survival, Dallas, TX, Jun. 28-30, 1999.

L. E. Gomez, R. S. Mohan, O. Shoham, & G. E. Kouba, "Aspect Ratio Modeling and Design Procedure for GLCC Compact Separators", (refereed abstract) full paper in the Proceedings of the Energy Sources Technology Conference and Exhibition (ETCE'99) of ASME Petroleum Division, Feb. 1-2, Houston, TX, 1999.

L. E. Gomez, R. S. Mohan, O. Shoham, & G. E. Kouba, "Enhanced Mechanistic Model and Field Application Design of Gas-Liquid Cylindrical Cyclone Separators" SPE 49174, (refereed abstract) full paper in the Proceedings of the 1998 SPE Annual Technical Conference and Exhibition, Sep. 27-30, New Orleans, 1998.

S. Wang, R. S. Mohan, O. Shoham, & G. E. Kouba, "Dynamic Simulation and Control System Design of Gas-Liquid Cylindrical Cyclone Separators" (refereed abstract) full paper in the Proceedings of the 1998 SPE Annual Technical Conference and Exhibition, Sep. 27-30, New Orleans, 1998.

S. Wang, R. S. Mohan, O. Shoham, & G. E. Kouba, "Performance Improvement of Gas-Liquid Cylindrical Cyclone Separators Using Passive Control System" (refereed abstract) full paper in proceedings of the Energy Sources Technology Conference and Exhibition (ETCE'98) of ASME Petroleum Division, ETCE98-4651, pp. 1-32, 1998 (Awarded ETCE'98 Jacobson Best Paper Award).

I. Mantilla, Shirazi, S. A. and O. Shoham, "Flow Field Prediction and Bubble Trajectory Model in Gas-Liquid Cylindrical Cyclone (GLCC) Compact Separators", Journal of Energy Resources Technology, Mar. 1999.

F. M. Erdal, S. A. Shirazi, SPE, I. Mantilla, SPE, O. Shoham, "CFD Study of Bubble Carry-Under in Gas-Liquid Cylindrical Cyclone Separators", 1998 SPE Annual Technical Conference and Exhibition held in New Orleans, Louisiana, Sep. 27-30, 1998.

* cited by examiner

OIL-WATER EMULSION BREAKUP (OWEB) PROCESS AND SYSTEM

CROSS-REFERENCE

This application is based on and claims priority to U.S. Provisional Patent Application Ser. No. 63/087,441, filed Oct. 5, 2020, which is incorporated herein in its entirety by reference.

BACKGROUND OF THE INVENTION

1. Field of the Invention

The present invention is directed to an in-line system and a process to enhance and accelerate separation of oil from water by an inverted emulsion process through controlled injection of water or controlled extraction of oil or both.

2. Description of the Related Art

Subterranean oil and natural gas are produced in the energy industry along with varying amounts of water, where the water fraction increases as the reservoirs mature. The energy industry encounters oil in water emulsions during the production, transportation, and separation of crude oil and natural gas. The produced fluids are sheared as they flow from the subterranean reservoir to downstream facilities through various tubing, pipelines, and via restrictions including chokes, orifices, flow meters, valves, and elbows, leading to the creation of stable emulsions. In addition, naturally occurring surface-active agents including asphaltenes, resins, wax, and naphthenic acids, as well as solid particles (clay, loose sands, silica, and inorganic salts), also act as emulsion stabilizers and tend to create stable emulsions.

Production from unconsolidated reservoirs with low formation strength can cause the generation of sand particles. Also, sand particles can be entrained in the produced fluids from the downhole formation around the wellbore. Another reason for sand production might be owing to the increase in the percentage of water or watercut, which results in the reduction of surface energy and grain-to-grain cohesiveness.

Entrainment of hydrophobic nanoparticles in production fluids is common. Emulsions with different degrees of stability are formed in the presence of emulsifiers including certain natural components (such as asphaltenes and paraffines), solid nanoparticles (NP) which are produced from unconsolidated reservoirs or added chemicals, and the shear and agitation provided by equipment such as chokes, valves, pumps, and other restrictions.

Oil-in-water (O/W) emulsions are often found in produced water. Emulsions, however, present a certain degree of stability after the agitation stops, due to the presence of a third component (emulsifiers or surface-active agents), which adsorbs at the oil-water interphase, preventing the coalescence of the dispersed fluid droplets and by forming a protective visco-elastic film around them and reducing the interfacial tension. The stability of an emulsion refers to the ability to resist physical and chemical properties changes over time. Tight emulsions may take hours or days, even weeks or months or, occasionally, even years to separate.

In the energy industry, the two immiscible liquids are the produced water, and the produced crude oil, whereas the agitation can be provided by the turbulence in the pipes, or external agitation such as pumps, or cross-sectional area reductions, namely, chokes and valves. Even though emulsions are inherently unstable, the presence of surface-active agents produces a certain degree of stability, which can be classified as loose (when separation occurs in a few minutes), medium (separation occurs in tens of minutes) or tight (separation takes hours or days or even longer). In crude oil, natural compounds such as asphaltenes, resins, and waxes act as the primary emulsion stabilizers.

The emulsion stability is also affected by other factors, such as the presence of solid particles, fluctuations of the temperature, the droplet size, and water pH.

Stability in certain emulsions is also generated through silica-based nanoparticles. These elements present different wettabilities, which means that they have a preference of what media to stay in. This property of wettability could be characterized by the term "nanoparticle contact angle". This contact angle is the equivalent of the hydrophilic-lipophilic balance of the common surfactants.

Tight emulsions can cause operational problems, such as high frictional pressure drop, decreased oil-water separation rate, and ultimately lower oil production. As emulsions are difficult to break up and separate, they pose potential safety concerns and increased maintenance costs due to corrosion.

It would be desirable to provide an emulsion breakup process and system in order to reduce costs in transportation, and preserve the integrity of equipment and facilities. The content of one phase into the other one produces only negative consequences, reducing the quality of the oil phase as water increases, and increasing the produced water contamination, which is often regulated by government and environmental entities.

It would be desirable to provide an in-line system and process to enhance and accelerate separation of oil from water by an inverted emulsion process.

It would also be desirable to provide a system and process to enhance and accelerate separation of oil from water by an inverted emulsion process through controlled injection of water or through controlled extraction of oil, or both.

It would also be desirable to provide an in-line system and process to enhance and accelerate separation of oil from water by a simple inverted emulsion process which could easily be employed near the well head of a subterranean reservoir before further transportation and processing.

SUMMARY OF THE INVENTION

The present invention is directed to an in-line system and process to enhance and accelerate separation of oil from water through controlled injection of water or controlled extraction of oil or both.

In one preferred embodiment, an oil-water mixture inlet line is configured to receive an incoming oil and water liquid mixture, which may be stabilized by nanoparticles (NP), surfactants or both.

A water injection inlet line in communication with the oil-water mixture inlet line directs water into the oil-water mixture inlet line.

A water sensor in communication with the oil-water mixture inlet line is configured to sense percentage of water. A water injection valve juxtaposed in the water injection inlet line is in communication with the water sensor. A controller in communication with both the water injection valve and the water sensor controls the amount of water injected.

A liquid-liquid separator having an inlet configured to receive the combination oil and water mixture and the injected water separates liquid into an oil phase and a water phase.

After separation in the liquid-liquid separator, water flows through a lower leg outlet while oil exits through an upper leg outlet.

DETAILED DESCRIPTION OF THE INVENTION

The embodiments discussed herein are merely illustrative of specific manners in which to make and use the invention and are not to be interpreted as limiting the scope.

While the invention has been described with a certain degree of particularity, it is to be noted that many modifications may be made in the details of the invention's construction and the arrangement of its components without departing from the scope of this disclosure. It is understood that the invention is not limited to the embodiments set forth herein for purposes of exemplification.

Figure 1:
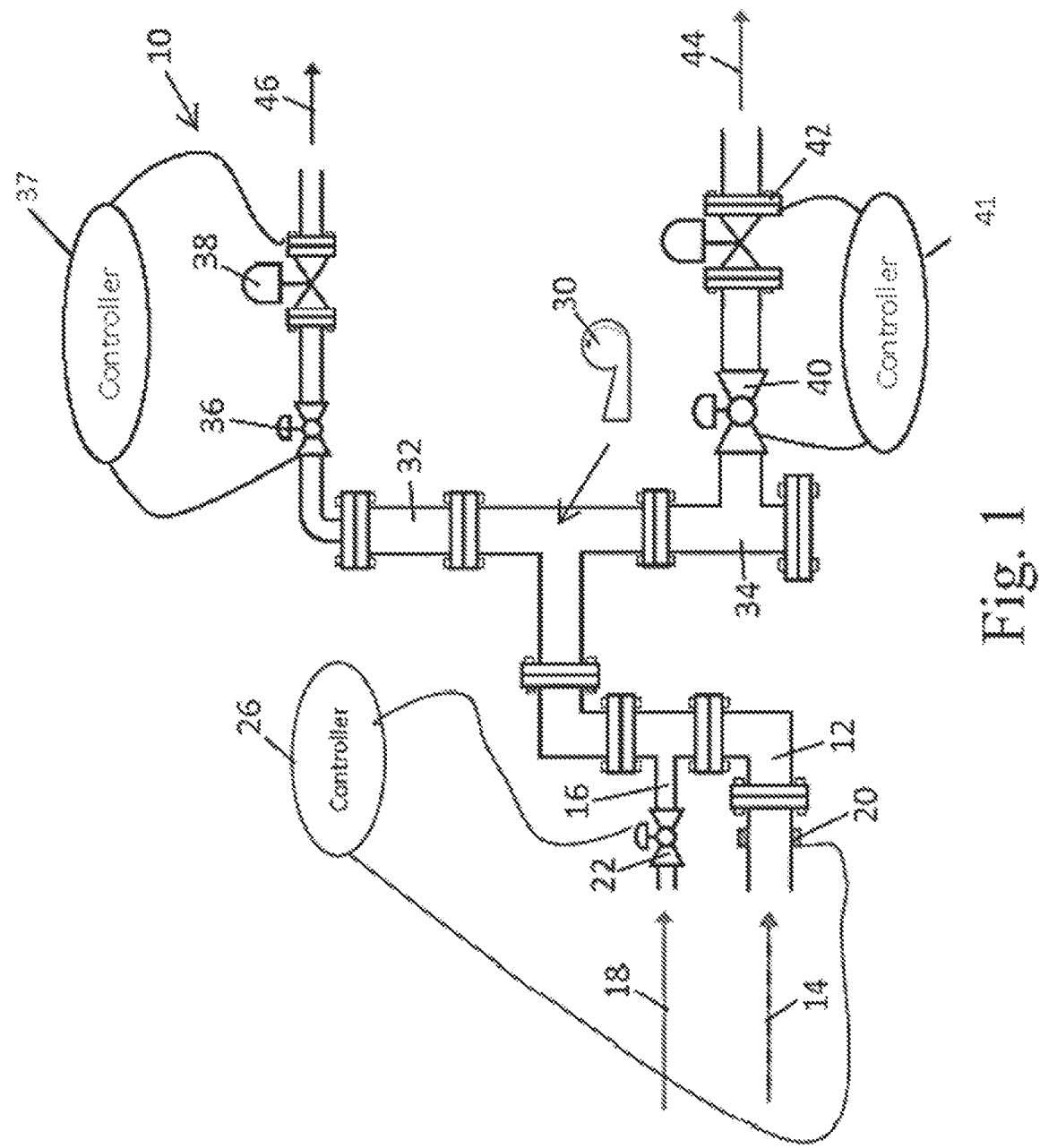
FIG. 1 illustrates a simplified schematic diagram of a first preferred embodiment of an oil-water emulsion breakup system constructed in accordance with the present invention.

Referring to the drawings in detail, FIG. 1 illustrates a schematic diagram of a first preferred embodiment of an oil-water emulsion breakup system 10 constructed in accordance with the present invention.

An oil-water mixture inlet line 12 is configured to receive an incoming oil and water liquid mixture, as shown by arrow 14, such as a mixture extracted from a subterranean reservoir. The mixture may be stabilized by hydrophobic nanoparticles, by surfactants of low hydrophilic-lipophilic balance or both.

A water injection inlet line 16 in communication with said oil-water mixture inlet line 12 is configured to direct water into said oil-water mixture inlet line, as shown by arrow 18.

A water sensor 20 in communication with said oil-water mixture inlet line 12 is configured to sense percentage of water by mass in the oil-water mixture. The water sensor 20 is upstream of the water injection inlet line 16.

A water injection valve 22 is juxtaposed in the water injection inlet line 16. A controller 26 is in communication with the water injection valve 22 and in communication with the water sensor 20. Accordingly, the amount of water injected through the water injection inlet line 16 may be controlled.

External water shown by arrow 18 is injected into the water injection inlet line 16 through the control valve 22 when the watercut sensor 20 at the oil-water inlet records watercut less than a setpoint watercut, in order to increase the water percentage and reduce "emulsifier" or "stabilizing agent" concentration in the system and thereby promote separation.

A liquid-liquid separator 30 having an inlet is configured to receive the combination oil and water mixture and the injected water. The liquid-liquid separator 30 (shown in exploded view in FIG. 1) is configured to separate liquid into an oil phase and a water phase.

In one configuration, the liquid-liquid separator 30 is a cylindrical cyclone separator having a horizontal inlet and a tangential nozzle with an opening between 25 and 30 percent of the horizontal inlet cross-section.

The liquid-liquid separator 30 includes a vertical section that is equipped with a horizontal or near horizontal (with a downward incline of approximately 1%) inlet through which an oil-water mixture entrained with nanoparticles, surfactants, or both enters. A tangential nozzle with an opening of 25-30% of the inlet section cross-sectional area is placed at the end of the inlet line. The nozzle generates swirling flow in the separator body, generating centrifugal force that separates the oil and water phases radially. After separation, water flows through a lower leg outlet 34 as shown by arrow 44 while the oil exits through an upper leg outlet 32 as shown by arrow 46.

The upper leg 32 in communication with the liquid-liquid separator 30 is configured to receive oil separated in the liquid-liquid separator. The lower leg 34 is in communication with the liquid-liquid separator 30 and is configured to receive water.

The upper leg 32 includes an oil mass flow meter 36 and an oil control valve 38 configured to control flow of oil.

A controller 37 is in communication with the oil mass flow meter 36 and oil control valve 38. The oil mass flow meter 36 also measures the density of the oil phase and communicates to the controller 37. If the density of oil is more than a setpoint density (corresponding to pure oil), the oil control valve will close sufficiently to obtain maximum flow rate of pure oil with density as close as possible to the setpoint density.

The lower leg 34 includes a mass flow meter 40 and a water control valve 42 configured to control flow of water.

A controller 41 is in communication with the water mass flow meter 40 and water control valve 42. The water mass flow meter 40 also measures the density of the water phase and communicates to the controller 44. If the density of water is less than a setpoint density (corresponding to pure water), the water control valve 42 will close sufficiently to obtain maximum flow rate of pure water with density as close as possible to the setpoint density.

Figure 2:
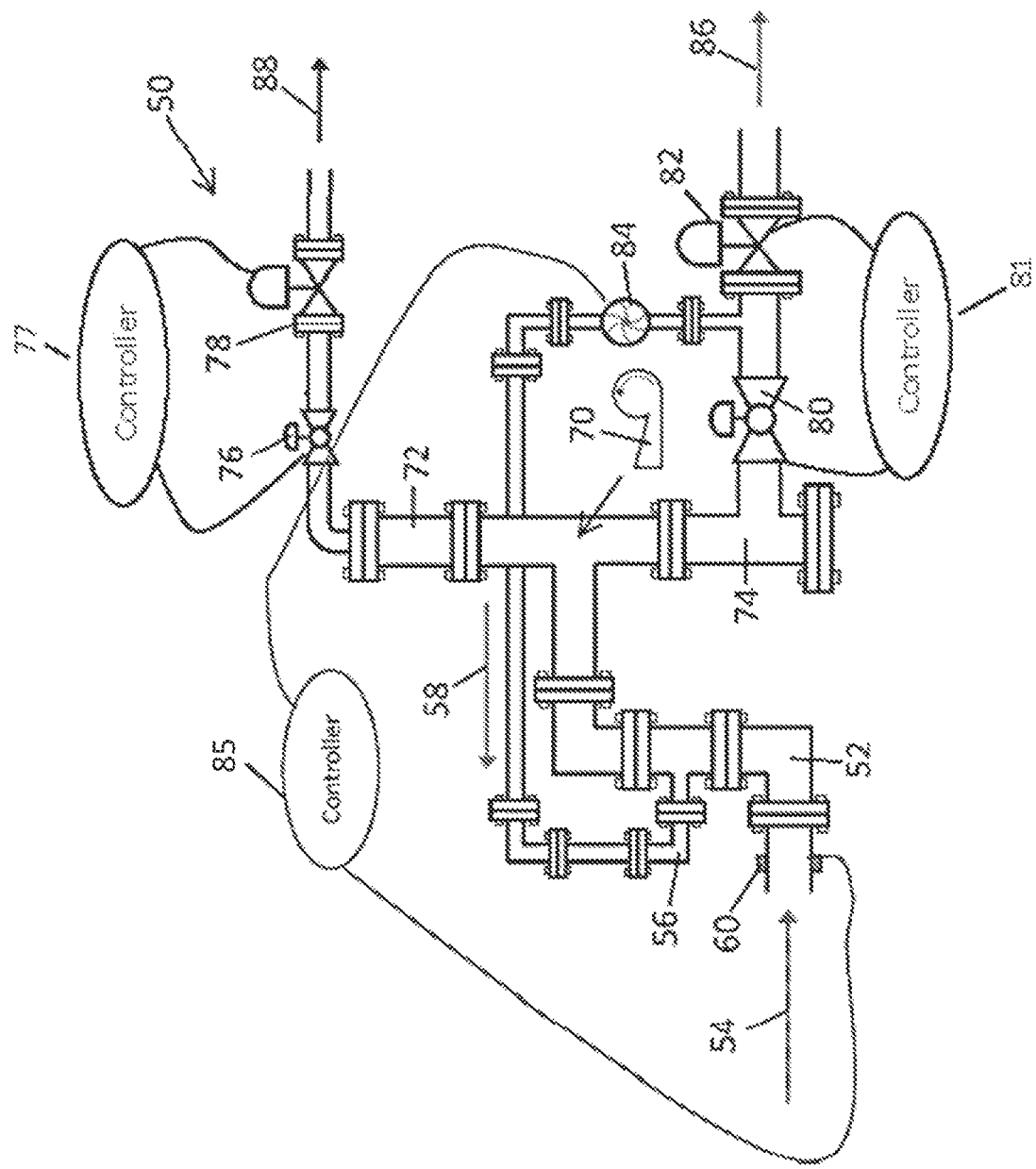
FIG. 2 illustrates a schematic diagram of a second preferred embodiment of an oil-water emulsion breakup system constructed in accordance with the present invention.

FIG. 2 illustrates a schematic diagram of a second preferred embodiment of an oil-water emulsion breakup system 50 constructed in accordance with the present invention.

An oil-water mixture inlet line 52 is configured to receive an incoming oil and water liquid mixture, as shown by arrow 54, such as a mixture extracted from a subterranean reservoir.

A water injection inlet line 56 in communication with said oil-water mixture inlet line 52 is configured to direct water into said oil-water mixture inlet line, as shown by arrow 58.

A water sensor 60 in communication with said oil-water mixture inlet line 52 is configured to sense percentage of water by mass in the incoming oil-water mixture. The water sensor 60 is upstream of the water injection inlet line 56.

A liquid-liquid separator 70 has an inlet configured to receive the combination oil and water mixture and the injected water. The liquid-liquid separator 70 is configured to separate liquid into an oil phase and a water phase.

In one configuration, the liquid-liquid separator 70 is a cylindrical cyclone separator having a horizontal or near horizontal (with a downward incline of approximately 1%) inlet and a tangential nozzle with an opening between 25 and 30 percent of the horizontal inlet cross-section.

The liquid-liquid separator 70 includes a vertical section equipped with a horizontal inlet through which an oil-water mixture entrained with nanoparticles, surfactants, or both enters. A tangential nozzle with an opening of 25-30% of the inlet section cross-sectional area is placed at the end of the inlet line. The nozzle generates swirling flow in the separator body, generating centrifugal force that separates the oil and water phases radially. After separation, water flows through a lower leg outlet 74 as shown by arrow 86 while the oil exits through an upper leg outlet 72 as shown by arrow 88.

The upper leg 72 in communication with the liquid-liquid separator 70 is configured to receive oil separated in the liquid-liquid separator 70. The lower leg 74 is in communication with the liquid-liquid separator 70 and is configured to receive water.

The upper leg 72 includes an oil mass flow meter 76 and an oil control valve 78 configured to control flow of oil.

A controller 77 is in communication with the oil mass flow meter 76 and oil control valve 78. The oil mass flow meter also measures the density of the oil phase and communicates to the controller. If the density of oil is more than a setpoint density (corresponding to pure oil), the oil control valve will close sufficiently to obtain maximum flow rate of pure oil with density as close as possible to the setpoint density.

The lower leg 74 includes a water mass flow meter 80 and a water control valve 82 configured to control flow of water.

A controller 81 is in communication with the water mass flow meter 80 and water control valve 82. The water mass flow meter also measures the density of the water phase and communicates to the controller 81. If the density of water is less than a setpoint density (corresponding to pure water), the water control valve 82 will close sufficiently to obtain maximum flow rate of pure water with density as close as possible to the setpoint density.

The water injection inlet line 56 is in communication with the lower leg 74. Water is recirculated from lower leg 74 back into the inlet line 52 utilizing a pump 84. The pump is equipped with a variable frequency drive (VFD).

A controller 85 is in communication with the variable frequency drive pump 84 and with the water sensor 60. Accordingly, when the watercut sensor 60 records watercut less than a set point percentage of watercut, the pump speed is increased by the VFD pump 84.

Figure 3:
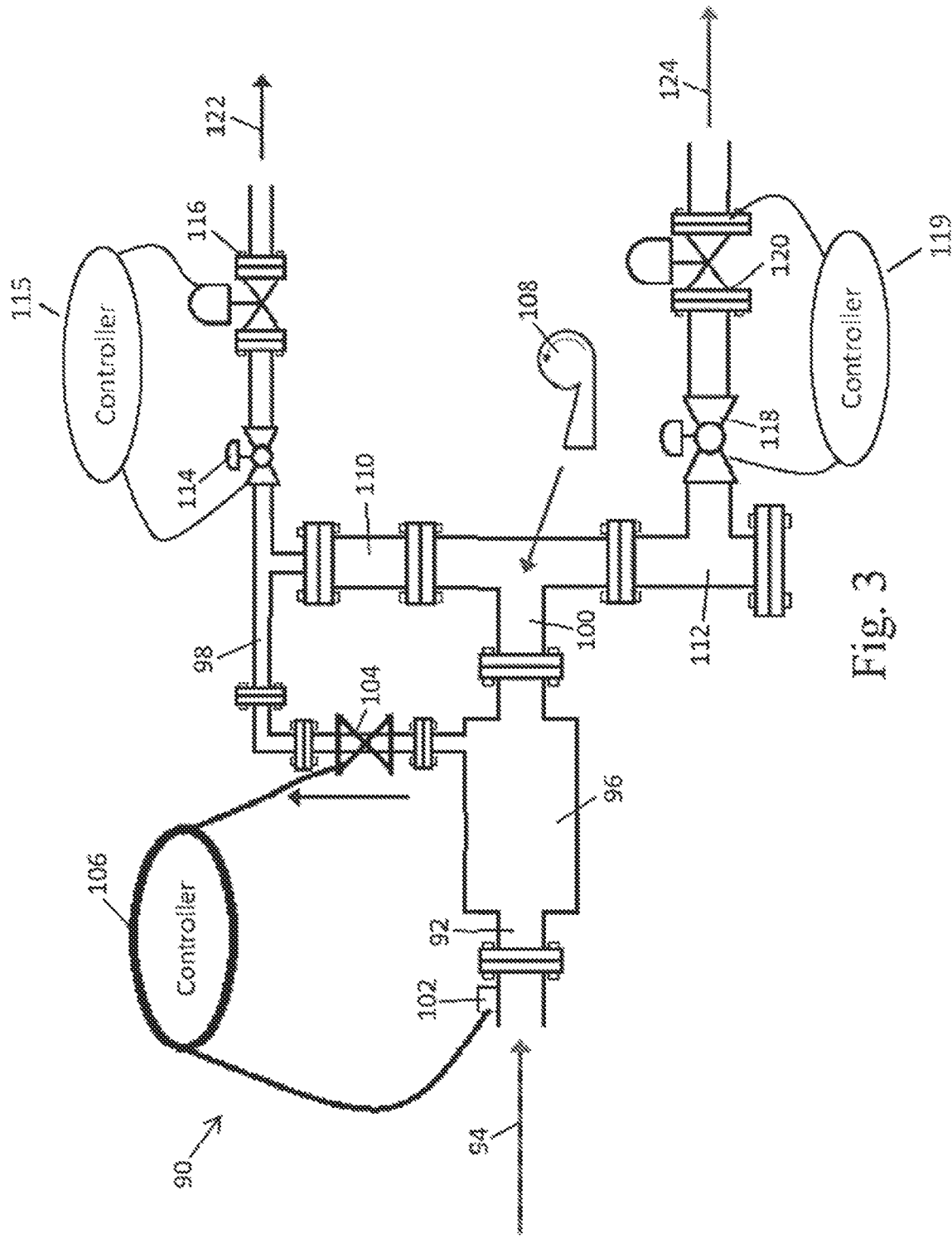
FIG. 3 illustrates a schematic diagram of a third preferred embodiment of an oil-water emulsion breakup system of the present invention.

FIG. 3 illustrates a schematic diagram of a third preferred embodiment of an emulsion breakup system 90 of the present invention.

An oil-water mixture inlet line 92 is configured to receive an incoming oil and water liquid mixture as shown by arrow 94, such as a mixture extracted from a subterranean reservoir.

A horizontal pipe separator 96 is in communication with the oil-water mixture inlet line 92 to separate oil from the oil and water mixture by gravity, the horizontal pipe separator having an oil outlet line 98 and an oil-water mixture outlet line 100. In one arrangement, the horizontal pipe separator 96 has a diameter at least twice the inlet pipe line 92 diameter and the horizontal pipe separator has a length at least five times the inlet pipe line 92 diameter.

A water sensor 102 in communication with said oil-water mixture inlet line 92 is configured to sense percentage of water by mass in the oil-water mixture. The water sensor 102 is upstream of said horizontal pipe separator 96.

An oil valve 104 in the oil extraction line 98 is in communication with the water sensor 102. In one embodiment, a controller 106 is in communication with both the water sensor 102 and the oil valve 104. Accordingly, the amount of oil extracted is controlled based on the incoming water percentage.

A liquid-liquid separator 108 includes an inlet configured to receive the combination oil and water mixture from the horizontal separator outlet 100 and is configured to separate liquid into an oil phase and a water phase.

The liquid-liquid separator 108 is a cylindrical cyclone separator having a horizontal inlet and a tangential nozzle with an opening between 25 and 30 percent of the inlet cross-section. The nozzle generates swirling flow in the separator body, generating centrifugal force that separates the oil and water phases radially.

An upper leg 110 in communication with the liquid-liquid separator 108 is configured to receive oil flow from the liquid-liquid separator 108.

A lower leg 112 in communication with the liquid-liquid separator 108 is configured to receive water separated in the liquid-liquid separator 108.

The horizontal pipe separator 96 is, thus, installed upstream of the liquid-liquid separator 108. The horizontal pipe separator 96 promotes the pre-separation of the oil and water phases by gravity. Oil is extracted from the top of the horizontal pipe separator 96 to ensure clean oil at the top, which is injected into an upper leg 110, which is the oil outlet from the liquid-liquid separator.

The upper leg 110 includes an oil mass flow meter 114 and an oil control valve 116 configured to control flow of oil, as shown by arrow 122.

A controller 115 is in communication with the oil mass flow meter 114 and oil control valve 116. The oil mass flow meter also measures the density of the oil phase and communicates to the controller. If the density of oil is more than a setpoint density (corresponding to pure oil), the oil control valve will close sufficiently to obtain maximum flow rate of pure oil with density as close as possible to the setpoint density.

The lower leg 112 includes a water mass flow meter 118 and a water control valve 120 configured to control flow of water, as shown by arrow 124.

A controller 119 is in communication with the water mass flow meter 118 and water control valve 120. The water mass flow meter also measures the density of the water phase and communicates to the controller. If the density of water is less than a setpoint density (corresponding to pure water), the water control valve will close sufficiently to obtain maximum flow rate of pure water with density as close as possible to the setpoint density.

Figure 4:
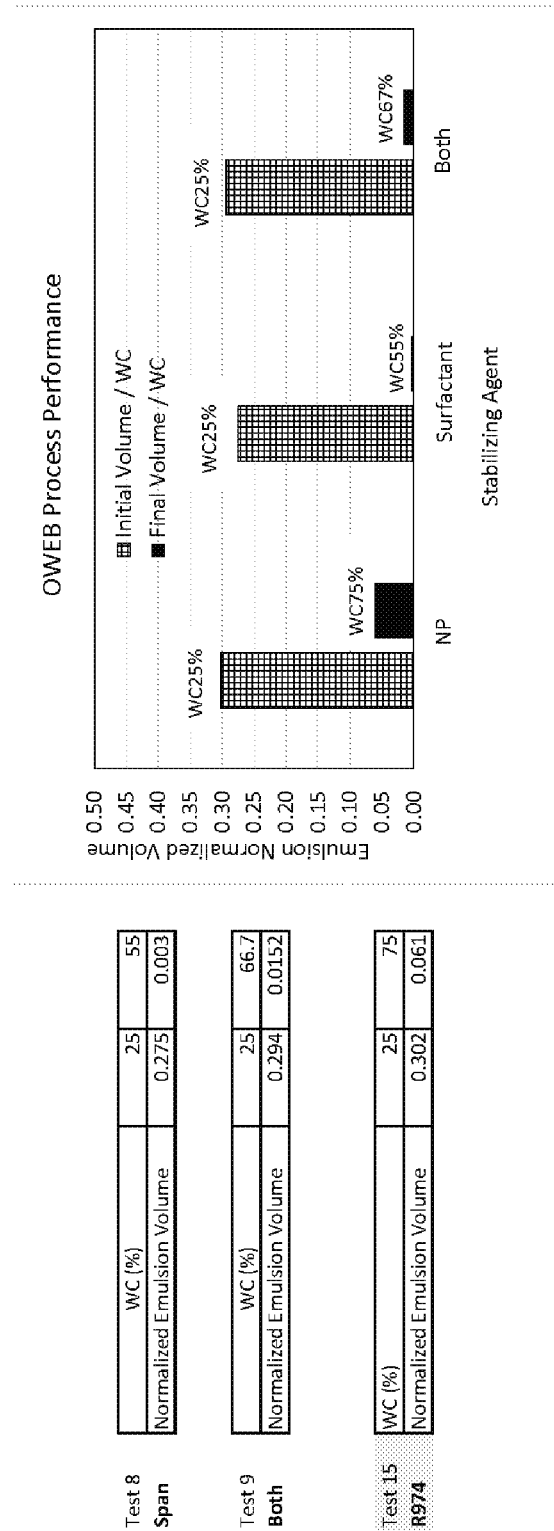
FIG. 4 illustrates a bar-graph that describes the performance of the invented oil-water emulsion break-up process and system.

FIG. 4 illustrates a bar-graph with experimental data from a batch separator highlighting the performance of the invented OWEB process and system. Three different types of stabilizing agents, i.e., nanoparticles, surfactants, or both, may be entrained or dissolved in the incoming oil-water liquid mixture, as shown on the X-axis. The W/O emulsion normalized volume is shown on the Y-axis. As an example, the third case on the X-axis, which refers to an incoming W/O mixture containing both hydrophobic nanoparticles and a surfactant of low HLB value (each stabilizing agent with a concentration of 0.01% by wt.) shows how the volume of the incoming emulsion is dramatically reduced after applying the invented OWEB process. The mechanism driving the performance of the OWEB process is a catastrophic inversion process by increasing the WC from 25% to 67%. This significantly enhances the separation kinetics of oil and water, while at the same time dramatically reducing the volume of the W/O dispersion.

Whereas, the invention has been described in relation to the drawings attached hereto, it should be understood that other and further modifications, apart from those shown or suggested herein, may be made within the scope of this invention.

What is claimed is:

1. An oil-water emulsion breakup system, which system comprises:

an oil-water mixture inlet line configured to receive an oil and water liquid mixture, stabilized by hydrophobic nanoparticles, surfactants of low hydrophilic-lipophilic (HLB) value, or both;

a water injection inlet line in communication with said oil-water mixture inlet line at a junction configured to direct water into said oil-water mixture inlet line;

a water sensor in communication with and located at said oil-water mixture inlet line configured to sense a percentage of water in said mixture, said water sensor upstream of said junction;

a water injection valve in said water injection inlet line in communication with said water sensor;

a controller in communication with said water sensor and said water injection valve, wherein said water injection valve is configured to adjust an amount of said water in response to said water sensor in order to promote separation;

a liquid-liquid separator having an inlet configured to receive said-oil and water liquid mixture and said water, said liquid-liquid separator configured to separate liquid into an oil phase and a water phase;

an upper leg in communication with said liquid-liquid separator configured to receive oil separated from said liquid-liquid separator;

a lower leg in communication with said liquid-liquid separator configured to receive water separated in said liquid-liquid separator;

a water recirculation line extending from said lower leg to said water injection inlet line; and a variable frequency drive pump on said water recirculation line positioned downstream of said lower leg and upstream of said junction, said variable frequency drive pump in communication with said water sensor.

2. The oil-water emulsion breakup system as set forth in claim 1 wherein said liquid-liquid separator is a cylindrical cyclone separator having a cylindrical body, a horizontal inlet and a tangential nozzle with an opening between 25 and 30 percent of the horizontal inlet cross-section.

3. The oil-water emulsion breakup system as set forth in claim 1 wherein said upper leg includes an oil control valve, an oil mass flow meter and an oil flow controller configured to control flow of oil.

4. The oil-water emulsion breakup system as set forth in claim 1 wherein said lower leg includes a water control valve, a water mass flow meter and a water flow controller configured to control flow of water.

5. The oil-water emulsion breakup system as set forth in claim 1 including a water recirculation controller in communication with said water sensor and said variable frequency drive pump.

6. The oil-water emulsion breakup system as forth in claim 1 wherein said oil and water mixture includes hydrophobic nanoparticles which are separated in said liquid-liquid separator.

* * * * *